Figure 1:
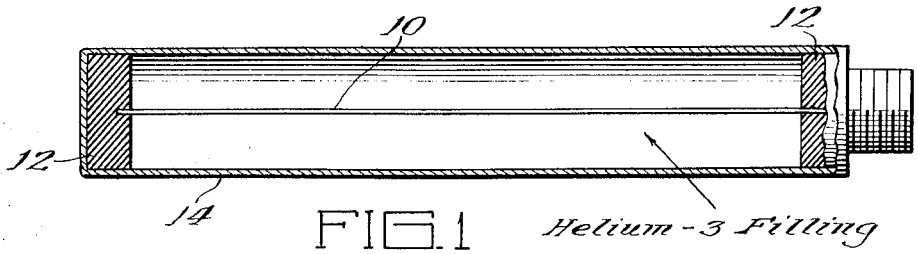

March 15, 1966   I. L. MORGAN   3,240,971

HELIUM-3 THERMAL NEUTRON PROPORTIONAL COUNTER

Filed May 29, 1962

Inventor:
Ira L. Morgan
By: Leonard ...
Attorney

United States Patent Office 3,240,971
Patented Mar. 15, 1966

3,240,971
HELIUM-3 THERMAL NEUTRON
PROPORTIONAL COUNTER
Ira L. Morgan, Austin, Tex., assignor to Texas Nuclear Corporation, Austin, Tex., a corporation of Texas
Filed May 29, 1962, Ser. No. 199,566
7 Claims. (Cl. 313—61)

This invention relates to an improvement in neutron detectors, and more particularly to proportional counters for high efficiency detection of neutrons of a wide range of energies employing helium-3 as the neutron-sensitive gaseous filling.

The relatively high cross section of helium-3 for neutrons, particularly neutrons of thermal energy, has long been known, and the n-p (neutron-proton) reaction occurring has been used, for example, as reported in a 1955 paper of Batchelor et al. in Review of Scientific Instruments, vol. 26, p. 1037, in devices such as neutron spectrometers. For this purpose, the employment of helium-3 has long been known to be highly advantageous over a detection gas such as boron trifluoride, whose emitted alpha particle is of constant energy, so that the ionization produced by an incident neutron is extremely remote from proportionality to neutron energy, since the energy of the incident neutron which is captured is divided between the highly ionizing energy of the alpha particle emitted and the kinetic energy imparted to the relatively non-ionizing absorber nucleus incorporated in the complex heavy gas molecule.

One type of neutron detector which has occasionally been used, but which is suitable for measurements only of high flux because of the low efficiency of neutron detection is the helium-4 (normal helium) proportional counter, which is known to have a number of desirable characteristics, particularly with regard to low voltage operation at high pressures, as compared with the extremely high voltages which are required when boron trifluoride, the gas in most common use for the combination functions of neutron detection and proportional counter filling, is raised in pressure to values substantially above atmospheric pressure in order to increase the neutron detection efficiency.

In the employment of helium-3 as a neutron detector for spectroscopy, the helium-3 has been employed as a minor constituent used primarily for detector purposes, the predominant part of the mixture used for these purposes being a much heavier gas, because of the desire that so-called "wall effects" be eliminated to the maximum possible extent, i.e., so that the "stopping power" for the protons be increased to a much higher value than would be possible with a light gas such as any isotope of helium, the energy resolution of the spectrometer thus being greatly increased as compared with, for example, a spectrometer employing ordinary helium as the filling gas, in which detection is accomplished by the ionizing produced by the helium recoil, or a spectrometer employing helium-3 alone for the combined purpose of neutron detection by production of ionizing particles in response to the neutrons and detection of the ionizing particle so produced. These considerations, of course, are of much less importance in detectors used for purposes in which fine energy resolution is not particularly desired, the primary object being merely to measure neutron flux intensity, either without regard to energy or with regard only to broad energy categories such as "fast," "thermal" and "epithermal," the type of purpose for which boron trifluoride counters are normally employed, particularly for thermal and epithermal neutrons. The boron trifluoride counter has the so-called "$1/v$" response, i.e., with efficiency inversely proportional to energy of the incident neutron, so that the primary utility of such counters is in measuring thermal and epithermal neutron flux, the efficiency for fast neutrons being so low that other types of detectors are normally used for this purpose, since in any practical utilization for measurement of fast flux, even a pure fast neutron beam will produce, because of moderation by the surroundings, a sufficient spurious flux of thermal and epithermal neutrons to "bury" the desired measurement of fast neutrons in the spurious background because of the tremendous increase in efficiency at lower energies. In this type of use, the matter of wall effects (failure of ionizing particles to have their energy absorbed before leaving the sensitive volume) shows up primarily as a reduction of efficiency, since the wall effects (which of course occur to some extent even with alpha particle reactions) may produce pulses from events near the walls which are below the level required to pass the threshold discriminator employed in such uses for discrimination against gamma-rays, noise, etc., such reduction being relatively harmless as compared with the case of the neutron spectrometer designed to extend to high energies, where the wall effects may, unless held to a very low proportion, make the pulse-size information meaningless as energy information.

Since wall effects are no great problem in a mere detector for thermal and epithermal neutrons, in which, at the most, only the grossest kind of energy discrimination is desired, and fast neutron response is of little or no importance, a proportional counter of the type heretofore employed with a minor proportion of helium-3 and a major proportion of a heavier gas serving as a stopping gas may achieve much higher efficiency for thermal and epithermal neutrons, and at the same time obtain the well known voltage advantages of helium as a proportional counter gas for high filling pressures by substitution of further helium-3 for the stopping gas. However, as will hereinafter be pointed out, it has been found that such a construction falls far short, in a number of respects, of producing the most desirable kind of high efficiency neutron counter for thermal neutrons, and it is the object of the present invention to provide a proportional counter structure for the detection and measurement of thermal neutrons which is much more suitable for this purpose from a number of standpoints to be discussed than would be suggested from such prior devices.

The experimentation forming the basis of the present invention has demonstrated that there are a substantial number of values and parameters which must be observed in the construction of high efficiency counters for thermal and epithermal neutrons employing helium-3 as the filling gas, particularly where the response to thermal energies is to be maximized. Although each of these factors contributes to the same overall desired result, it will of course be observed that certain aspects of the teachings of the invention may in some cases be utilized in counters which, for one reason or another, may omit certain of the present construction features.

It has been found that it is an essential requirement for a counter of high sensitivity having a filling consisting in the main of helium-3 that this gas must, for proper detection and measurement of very low neutron flux, be purified to remove all traces of tritium to a degree heretofore unknown. The beta particle emission of tritium, of course, produces ionization in the chamber of the counter. This is relatively innocuous in a spectrometer-type instrument in which high sensitivity is normally of secondary or negligible interest, the low beta background appearing from this source when the helium-3 is a relatively minor component being of no substantial concern in an instrument for making measurements at high intensities; however there is, even in this case, some problem encountered in this respect in spectrometer use, as pointed out in the paper mentioned above. When the entire filling of a superatmospheric pressure counter is of helium-3, as in the present instance, the beta pile-up emanating from the helium-3 can create a noise which readily becomes indistinguishable from the measured signal when sensitive measurements of thermal neutrons are attempted. It is found that the tritium content of any helium-3 counter of practical size, filled in the pressure ranges later to be mentioned, for use as a detector of thermal neutrons, must be less than one part in $10^{10}$, and preferably in $10^{11}$, in order that the device be operative for its purpose as a sensitive thermal neutron detector.

Another aspect of construction which is important is the dimensioning of the cylindrical counter. In the device heretofore used as a spectrometer, as described above, the sensitive volume was in the form of a cylinder whose dimension relation is designed for energy measurements and is poorly suited for ordinary use as a sensitive detector of thermal and epithermal neutrons. A cylindrical counter for this purpose has an active or sensitive volume whose length is at least 4 times its diameter, and preferably an even higher ratio of length to diameter is employed. It is also found that the mere filling of a counter with helium-3 at increasingly high pressures does not, as might otherwise be surmised, lead to constantly increasing efficiency in a detector for the present purposes, but that on the contrary the pressure, and the relation of the pressure to the diameter, must be held within a fairly narrow range. It will be obvious that with any finite neutron cross section for thermal energies, ultimately there must be approached, as pressure is increased in any structure resembling an "infinite slab," a pressure at which the slab appears "black," i.e., absorbs everything incident thereon. It will likewise be clear, however, that at least in theory, such a point can never be reached in a cylindrical, as opposed to a "slab," construction. It is found that an elongated circular cylindrical counter, irrespective of its particular length and diameter, should have a filling, for use as a high efficiency detector of thermal neutrons, of helium-3 in a concentration or density between .0003 and .0014, and preferably between .0006 and .0010, mole per centimeter of length per inch of diameter of the cylindrical active volume. For example, in a counter having an active or sensitive volume of .93 inch diameter (a typical value of a commercial counter body of one of the types heretofore used in other proportional counters), the sensitive length should be at least about 4 inches, as discussed above, and the helium-3 content should be not less than 2 atmospheres (approximately .0004 mole per centimeter of length per inch of diameter) or more than 7 atmospheres (approximately .0014 mole per centimeter of length per inch of diameter), and is preferably between 3 atmospheres (approximately .0006 mole per centimeter of length per inch of diameter) and 5 atmospheres (approximately .0010 mole per centimeter of length per inch of diameter). At higher pressures, two adverse effects are encountered. In the first place, as regards the efficiency for thermal neutrons, the use of additional helium-3 produces very little increase in efficiency. The economy factor is in itself important in this respect because of the high cost of helium-3, particularly when purified to the degree mentioned above. In addition, however, there are further reasons for limiting the helium-3 content. Beyond such a value the response or efficiency curve of the counter as a function of energy becomes excessively distorted, so that the epithermal neutrons become grossly exaggerated in comparison to the thermals. By the same token, of course, it will be seen that in the case of a detector for epithermal neutrons only, i.e., a detector wrapped with cadmium to absorb the thermals, pressures substantially in excess of 7 atmospheres (in a counter of the diameter just mentioned) will be highly beneficial and may be used, in certain instances, to produce very high responses to epithermal neutrons, either as regards counting rate or as regards integrated current. However, the limitations just mentioned are applicable, of course, where thermal neutrons are of primary interest.

Regarding the lower limits of the pressure range of a counter as described above, these are fixed by the fact that at these aproximate pressures, the highest possible efficiencies for thermal neutrons are closely approached with a minimum of the costly gas, concentrations or pressures substantially below this point being more or less linear as regards production of thermal neutron efficiency.

The teachings of the invention may be generally understood, and readily used, from the general description above of the aims and objects of the inventions and the manner in which these aims and objects are accomplished. However, in accordance with the patent laws, there is shown in the annexed drawing, and described below, an embodiment of the invention for purposes of illustration.

Figure 2:
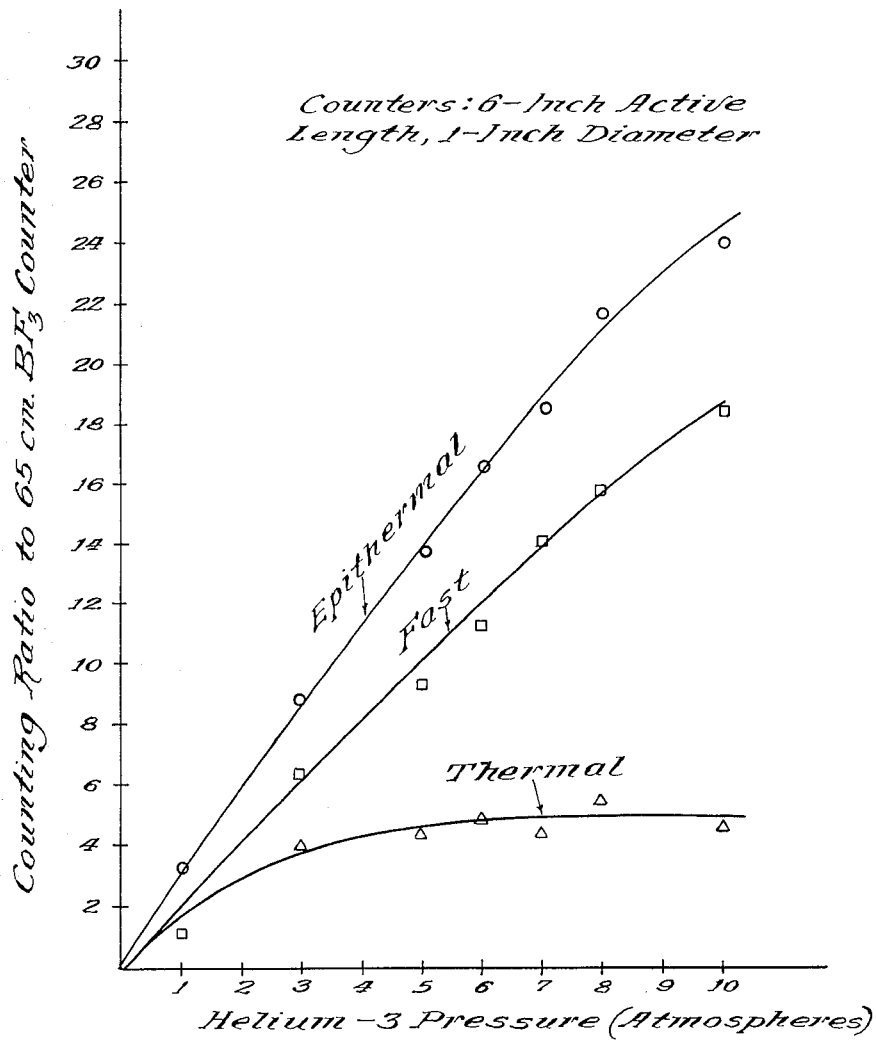

In the drawing:

FIGURE 1 is a highly schematic view of a proportional counter constructed in accordance with the teachings of the invention; and FIGURE 2 is a graph or plot showing the relative efficiencies of a counter constructed in accordance with the invention as a function of pressure in a particular counter body, for epithermal (epicadmium), fast, and thermal neutrons.

Referring now to the drawing, FIGURE 1 shows in highly schematic and representational form a proportional counter constructed in accordance with the present invention, the actual physical construction features of the counter thus schematically illustrated being of any well known type, the construction of counter bodies, seals, supporting insulators, electrical connectors, etc., being extremely well known in the art. Furthermore, it will readily be understood by those skilled in the art that although the schematic illustration shows the entire cylinder interior as forming the active or sensitive volume, any practical mechanical counter construction (selected for use with the present filling in the same manner as with any other proportional counter filling and accordingly not illustrated) normally has insensitive regions at the ends of the interior volume, with appropriate shields and guards for accurate definition of the counter volume to produce the desired uniform radial field between the electrodes.

In the schematic view of FIGURE 1, the elementary parts or portions shown are, of course, the usual anode wire 10 of a diameter adapted for proportional ion multiplication, insulatingly supported by end insulators 12 in the cathode-forming thermal-neutron-permeable counter body or cylinder 14 to form the usual coaxial electrode structure.

There are shown in FIGURE 2 experimental data on relative counting rate of a helium-3 counter as a function of pressure for thermal, epithermal, and fast neutrons. These data were taken with a 6-inch long (active or sensitive volume) counter of one-inch outside diameter and 35 mil wall thickness. The abscissa indicates the pressure of helium-3 in absolute terms. The ordinate is the ratio of the counting rate produced to that produced in a 65-centimeter pressure boron trifluoride counter of otherwise identical construction and under the same conditions. The data on thermal neutron response were taken with each counter separated from the neutron source by suitable moderator, the data on epithermal response were taken under similar conditions but with a cadmium shield on the counters (it will be understood that the absolute counting rates for this condition were extremely small as compared with the previous data, for both counters) and the fast neutron response was measured with a 14 mev. unmoderated source.

As will be seen from the individual points, the helium-3 counter described was tested at 1, 3, 5, 6, 7, 8 and 10 atmospheres, with the results indicated. In earlier tests, a counter of similar construction, except as to length, was tested with a 2½ atmosphere filling and found to have an overall efficiency as compared with an atmospheric-pressure boron-trifluoride counter conforming substantially to the indication of FIGURE 2, with appropriate correction for the difference in pressure of the latter as compared with that used in the data of FIGURE 2.

The operating voltages for the one-inch (outside) diameter counter described above varied from approximately 900 volts at 2 atmospheres to approximately 1225 volts at 7 atmospheres and approximately 1300 volts at 10 atmospheres with a 2 mil center wire or anode.

The substantially higher efficiency ratios shown in FIGURE 2 for the helium-3 counter for epithermal, as opposed to fast, neutrons, would at first appear to demonstrate that there is at least some portion or single energy of the former region in which previous information regarding the cross-section variation with energy was incomplete, but the deviation from superposition of the two curves being more probably ascribable to experimental error, particularly with regard to maintaining identical fast neutron conditions for such comparative data. The curves are of course plotted on the basis of the limited number of points shown for each of them.

The invention and its manner of use and operation will be readily understood and utilized from the foregoing. It also should be observed that it was found that proper and usable operation of the counters herein disclosed requires the presence of a small amount of a quench gas, carbon dioxide at 1.5 centimeters being found very suitable.

What is claimed is:

1. A thermal neutron proportional counter comprising a circular cylindrical thermal-neutron-permeable enclosure having coaxial anode and cathode electrodes adapted for proportional ion multiplication and having a ratio of length to diameter of at least 4 to 1 and containing helium-3 in a concentration between .0003 and .0014 mole per centimeter of length per inch of diameter, of a tritium content less than one part in $10^{10}$.

2. The proportional counter of claim 1 wherein said concentration is between .0004 and .0014 mole per centimeter of length per inch of diameter.

3. The proportional counter of claim 1 wherein the diameter of the enclosure is approximately one inch and the pressure of helium-3 is from 2 to 7 atmospheres.

4. The proportional counter of claim 1 wherein the diameter of the enclosure is approximately one inch and the pressure of helium-3 is from 3 to 5 atmospheres.

5. The proportional counter of claim 1 having the enclosure formed by the outer electrode.

6. The proportional counter of claim 2 wherein said concentration is between .0006 and .0010 mole per centimeter of length per inch of diameter.

7. The proportional counter of claim 2 wherein the tritium content is less than one part in $10^{11}$.

References Cited by the Examiner

UNITED STATES PATENTS

| | | | |
|---|---|---|---|
| 2,543,676 | 2/1951 | Thayer | 250—83.6 |
| 2,928,965 | 3/1960 | Bayard | 313—61 |
| 2,979,618 | 8/1961 | Richard | 313—61 |
| 3,102,198 | 8/1963 | Bonner | 250—83.1 |

OTHER REFERENCES

Batchelor et al.: The Review of Scientific Instruments, volume 26, No. 11, pages 1037–1047.

Korff: Electron and Nuclear Counters, D. Van Nostrand Co., 1946, reprinted January 1948, pages 79, 121 and 122.

Thompson: Portable Survey Meter, Nucleonics, volume 13, No. 3, March 1955, pages 44 to 46.

RALPH G. NILSON, *Primary Examiner.*

GEORGE N. WESTBY, V. LAFRANCHI,
J. W. LAWRENCE, *Examiners.*